Feb. 8, 1966    C. W. EARP ETAL    3,234,554
RADIO NAVIGATION SYSTEM
Filed Oct. 30, 1962    3 Sheets-Sheet 1
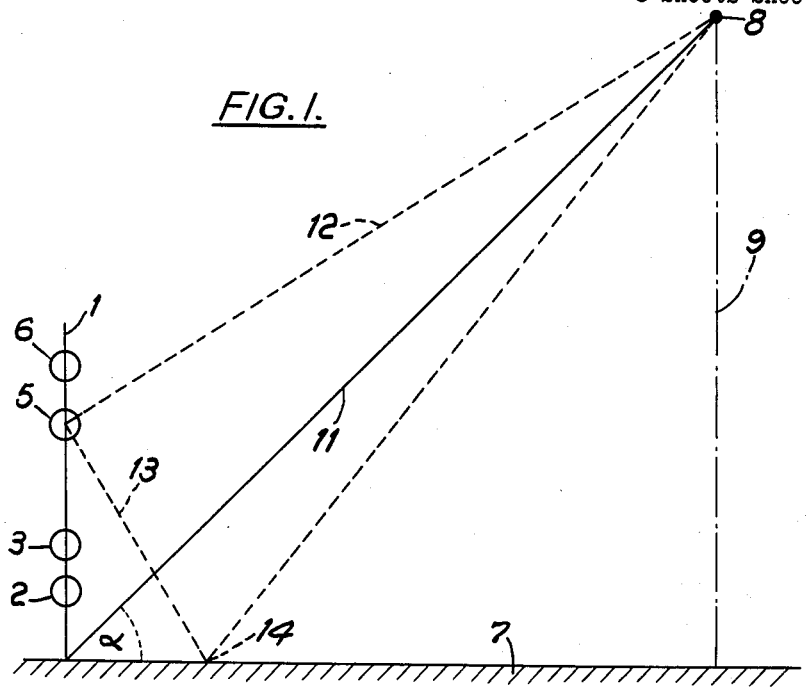
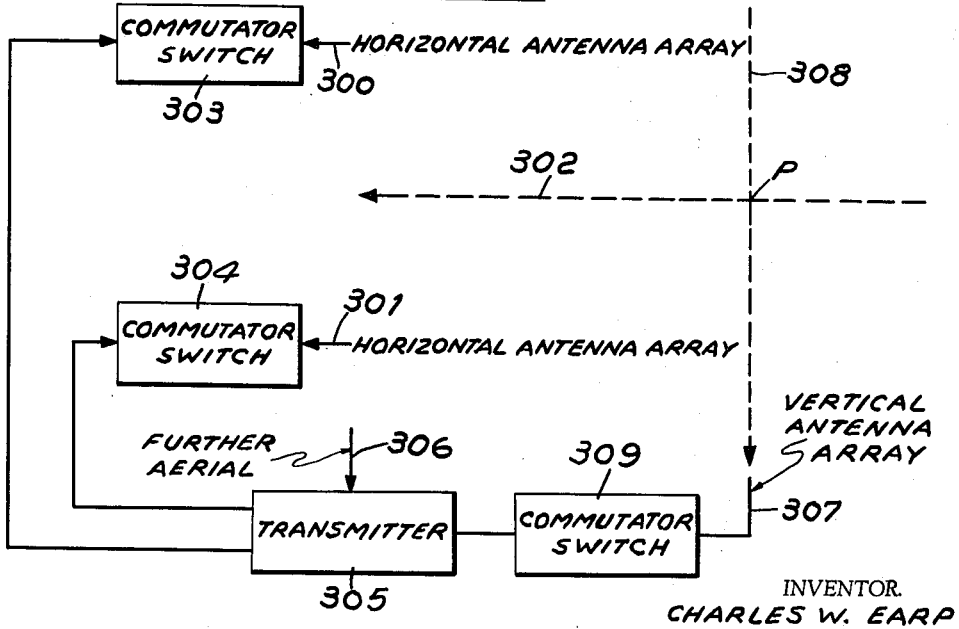
INVENTOR.
CHARLES W. EARP
ERNST KRAMAR
BY
ATTORNEY

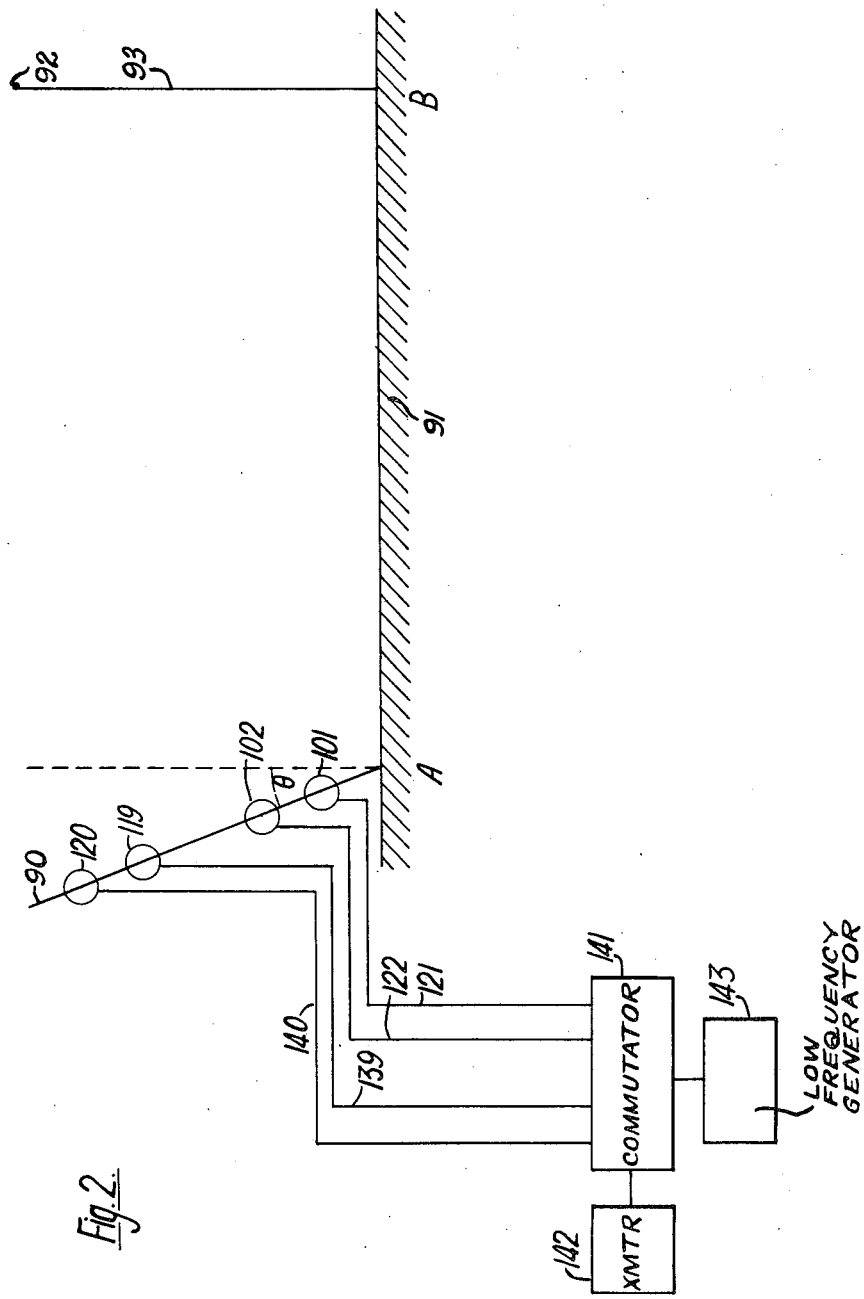

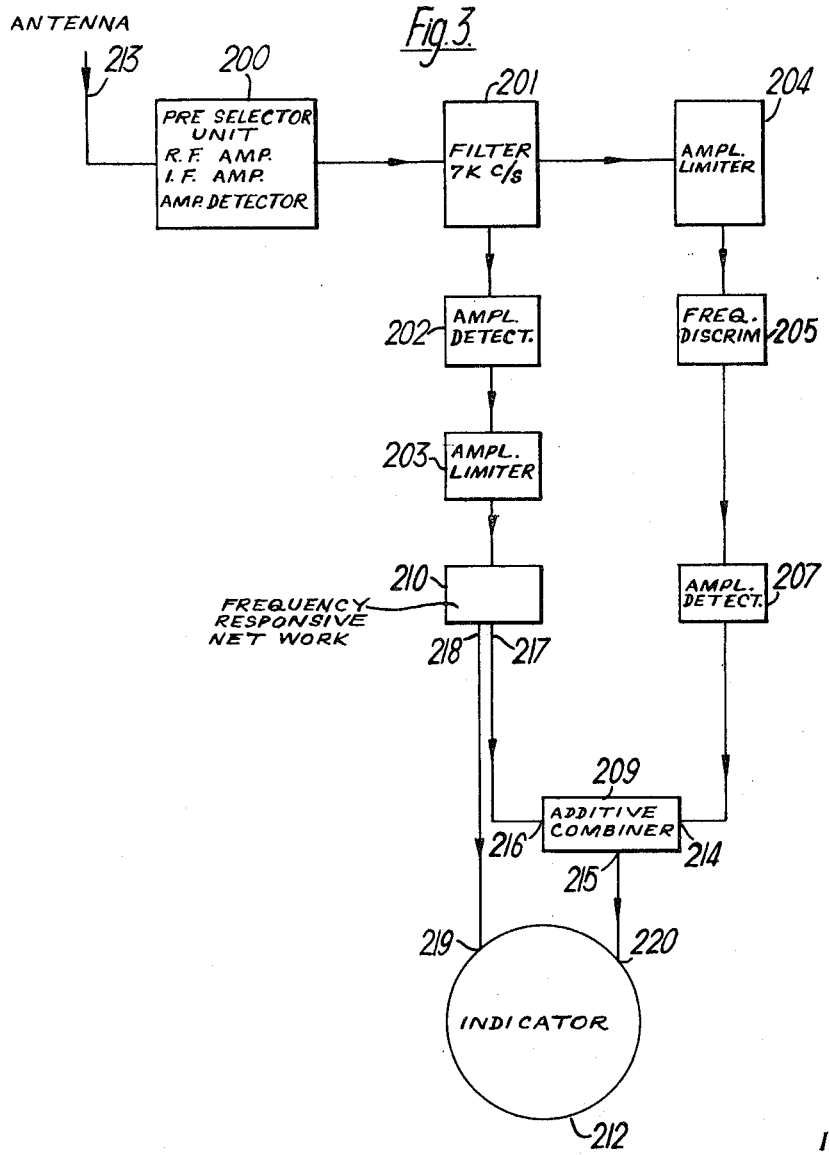

United States Patent Office 3,234,554
Patented Feb. 8, 1966

3,234,554
RADIO NAVIGATION SYSTEM
Charles William Earp, London, England, and Ernst Kramar, Pforzheim, Germany, assignors to International Standard Electric Corporation, New York, N.Y., a corporation of Delaware
Filed Oct. 30, 1962, Ser. No. 234,091
Claims priority, application Great Britain, Nov. 10, 1961, 40,393/61
13 Claims. (Cl. 343—108)

This invention relates to fixed and mobile equipment for use in a radio navigation system which enables the angle of elevation of a mobile station to be determined with respect to a fixed station on the ground.

According to one aspect of the invention there is provided a radio navigation system including at a fixed station an aerial array having a number of stacked aerials each arranged at a different height above ground, a common signal feed arrangement, and means to connect the common signal feed arrangement to each of the aerials in a cyclic order.

According to another aspect of the invention there is provided a mobile station of a radio navigation system to work with the above fixed station.

An arrangement illustrating the operation of a system using the invention and particular embodiments of the invention will now be described with reference to the drawings in which:

FIG. 1 shows a schematic diagram illustrating the operation of the system,

FIG. 2 shows a schematic diagram of a first glide-path beacon,

FIG. 3 shows a schematic diagram of part of a beacon receiver for use in an aircraft, and FIG. 4 shows a schematic diagram of a second glide-path beacon.

Referring to FIG. 1 there is shown an aerial array 1 which includes a number of aerials, shown at 2, 3, 5 and 6, which are vertically stacked above the ground, indicated by the horizontal line 7. An aircraft represented by the point 8 is at a vertical height above the ground represented by the chain-dotted line 9. The angle between a line 11 drawn between the aircraft 8 and the ground plane 7 at the base of the array 1 is represented by $\alpha$. The angle $\alpha$ will hereinafter be referred to as the angle of elevation of the aircraft.

The distance between the aircraft 8 and the array 1 is usually many times greater than the height of the array above the ground.

A radio transmitter (not shown) located on the ground includes a commutator arrangement whereby radio frequency electrical energy may be switched cyclically and successively to each one of the aerials 2–6 of the array 1.

Radio signals radiated by one of the aerials, for instance 5, and received at the aircraft 8 will be propagated across the intervening free space by a direct path, represented by the dotted line 12, and also by a path 13 which involves reflection from the ground at a point 14.

Radio signals radiated by any one of the other aerials 2–6 will also reach the aircraft 8 by a direct path and by a path including reflection from the ground. Radio signals picked-up by a receiving aerial installed on the aircraft 8 will therefore consist of a component received by the direct signal path, hereinafter referred to as the direct signal component, and a component received by reflections from the ground, hereinafter referred to as the ground-reflected component. The received direct and ground-reflected signal components will normally differ in phase owing to the difference between the lengths of the direct and ground-reflected signal paths. The cyclic switching of the radio energy from the transmitter to the individual aerials of the array gives rise to a cyclic phase modulation of both the direct and ground-reflected received signals, the deviation being dependent upon the angle of the aircraft elevation. The phase modulation is due to the cyclic changes in the path length of the received signals brought about by the aerial commutation. The rates of change of the direct and ground-reflected signal path lengths differ over one cycle of the aerial commutation, giving rise to a frequency displacement between the two signal components.

If the signals received by the aerial on the aircraft are amplitude-detected a beat signal may be obtained the mean frequency of which is representative of the angle of elevation of the aircraft. The beat signal is obtained by combining the direct and ground-reflected signals in an amplitude detector circuit. In the beacon receiver arrangement shown in FIG. 3 the amplitude detector is part of the preselector unit 200 and is referred to in line 11 in column 5 of the specification. As previously mentioned the direct and ground-reflected signals are displaced in frequency due to the differential change in the lengths of the paths of the direct and the ground-reflected signals. The frequency displacement between the two signals is dependent upon the angle of elevation of the aircraft.

The aerials may be arranged in space to give a sinusoidal modulation of the signal phase as a result of the commutation process.

In two embodiments of the invention described in this specification a linear saw-tooth modulation of the signal phase is provided by commutation to successive uniformly spaced aerials at a constant rate. The use of the latter arrangement provides a received signal having a comparatively narrow frequency spectrum, and the mean beat signal frequency is proportional to the sine of the angle of elevation of the signal.

The angle of elevation of the aircraft with respect to the ground at the transmitting aerial array may thus be ascertained by measuring the mean frequency of the beat signal. An important use of the invention arises in connection with aircraft glide-path systems, where the aircraft is required to approach the touch-down point on a glide-path of pre-determined, fixed angle of elevation with respect to the ground plane. For a particular glide-path slope or "glide-slope," there is thus a value of beat signal frequency representative of the glide slope. The frequency of the beat signal may, for example, be measured by means of a counter of the electronic type. It may sometimes be preferable to employ a frequency discriminator to measure the beat signal frequency; the frequency discriminator being tuned to the frequency representative of the desired glide-slope and providing an output of which the magnitude and sign is dependent upon the deviation of the actual glide-slope above and below the desired glide-slope.

In the glide-path system described above it is necessary, as in the case of certain other glide-path systems, to off-set the beacon aerial array from the approach path as glide-paths leading on to the beacon itself are not useful. Under this condition, the glide-slopes defined by beat signals of constant mean frequencies tend to flatten out near to the beacon and rise again beyond the nearest point of the approach-path to the beacon. It is particularly desirable to maintain the linearity of glide-paths of steep slope as close to the ground as possible. An improvement in the linearity of all glide-paths may be obtained by a modification of the beacon arrangements and of the receiver in the aircraft.

A first embodiment of the invention, which incorporates the above modifications, will now be described.

FIG. 2 shows a beacon aerial array 90 which includes 20 stacked aerials 101–120, four of which are shown at 101, 102, 119 and 120. The vertical height difference between each of the aerials is equivalent to λ/4, where λ is the wavelength of the operating radio signal. The lowest aerial 101 is mounted at a vertical height above ground also equivalent to λ/4. The longitudinal axis of the array 110 is inclined with respect to a line perpendicular to the ground plane 91 by a small angle $\theta$.

Each of the aerials 101–120 is connected by a feeder to commutator arrangement 141. Four of the feeders are shown at 121, 122, 139 and 140. These four feeders are connected between the commutator switch 141 and aerials 101, 102, 119 and 120 respectively. The commutator switch 141 is connected to a radio transmitter 142 by a feeder 145 and to a low-frequency generator 143.

Radio signals from the output of the transmitter 142 are fed successively and cyclically by the commutator switch 141 to each one of the aerials 101–120 over the corresponding aerial feeder. The commutation process is controlled by a signal obtained from the low-frequency generator 143. The repetition frequency of the commutation cycle is determined by the frequency of the low-frequency control signal from the generator 143. A similar type of commutator switch is described in United States Patent No. 2,521,702.

The point 92 represents an aircraft which is approaching the ground on a glide-path situated in a vertical plane represented by the vertical line 93, hereinafter referred to as the glide-plane. In this illustration the glide-plane cuts the paper perpendicularly along the line 93. The aircraft 108 is assumed to be approaching the ground on a course from south to north and its nearest point of approach to the beacon aerial array 90 occurs when the aircraft is due east thereof. The point 92 represents an aircraft receding from an observer situated to the south of the beacon array. The horizontal distance between the aircraft 92 and the array 90 is represented by the line AB. In practice the length of AB is usually many times greater than the height of the beacon aerial array. The beacon array 90 is inclined to the perpendicular in a direction at right angles to the line of approach of the aircraft, and in the embodiment it is presumed to have a westward tilt.

When the aircraft commences the glide-path approach to the touch-down point, its direction in azimuth with respect to the beacon array will be almost due south. Under this condition the westward tilt of the array will produce no significant effect on the signal received at the aircraft. As the aircraft closely approaches the position at which it is due east of the beacon array, the westward tilt of the beacon array causes an appreciable additional phase modulation of both the direct and ground-reflected signal components received at the aircraft. The phase modulation superimposed on both the direct and ground reflected signal components is in the same sense and the total received signal is therefore phase modulated to a degree dependent upon the bearing in azimuth of the aircraft from the beacon aerial array. The amplitude of the phase modulation is greatest when the aircraft is due east of the array.

The same effect would occur if the aerial array were given an eastward tilt, or again, if the aircraft were to approach on a north-south course. The phase modulation is produced by the tilting of the aerial array in a direction at right angles to the direction of approach of the aircraft.

The additional phase-modulation effect mentioned above is quite distinct from the phase modulation of the direct and ground-reflected signals received at the aircraft which was discussed in connection with the basic system illustrated in FIG. 1. The phase-modulation produced by commutation of the vertically stacked aerials is due to the different heights of the aerials above the ground and occurs whether the aerials are vertically stacked or inclined at some angle to the vertical. These phase modulations are regarded as quite distinct because they can be separated, and separation is possible at the receiver because they produce two quite different modulation effects.

The frequency modulation of the carrier is zero when the array is perpendicular and increases as the array is tilted with respect to the reflector. This occurs because the received wave is the sum of a direct wave and a reflected wave. The reflected wave appears to come from a mirror image antenna with the ground surface as the mirror surface and the frequency change of the reflected wave due to Doppler effect is therefore opposite to those of the direct wave. The two frequency changes are equal when the array is vertical; therefore in this case the frequency modulation is zero.

The phase of the received waves at a point in space is a function of the difference of the path lengths traversed to reach the point, this varying with the height of the antenna above the ground. The phase therefore also varies and produces an amplitude modulation of the received carrier which is a function of antenna switching speed. A small tilt of the array has a small effect on this amplitude modulation.

The angle of tilt of the beacon aerial array determines the maximum degree of the additional phase modulation obtained. The angle of tilt is adjusted so as to produce a degree of phase modulation suitable for the receiving arrangements. If the total height of the beacon aerial array is, as in this embodiment, 20 wavelengths of the radio signal, then a suitable angle of tilt, $\theta$, is 30 degrees. The value of the angle of tilt of the beacon antenna array is uncritical since the characteristics of the beacon receiver can be arranged to provide the correct amount of "proximity current" (from the phase modulation produced by tilting the aerial array) to compensate for the flattening-out of the glide slope when the aircraft is close to the beacon. The quoted value of 30 degrees is merely an example of a typical angle of tilt. The tilting of the aerial array does, of course, result in a reduction of the effective height of the array and sets a limit to the amount of tilt allowable in practice.

The additional phase modulation effect is utilized in obtaining a more linear glide-path approach in the following manner.

In addition to the signal radiated by the commutated aerials of the beacon array, an additional signal in the form of an unmodulated carrier wave, whose frequency is displaced by 7 kc./s. from the center frequency of the commutated aerial signal, is provided at the ground station.

This unmodulated carrier signal beats in an amplitude detector in the aircraft receiver with the phase-modulated signals received from the commutated aerial array, to produce beat frequency signals having a centre frequency equal to the frequency difference between the two signals, 7 kc./s.

This 7 kc./s. signal is amplitude modulated at a modulation frequency which is representative of the angle of elevation of the aircraft. When the aircraft is close to the beacon aerial array the 7 kc./s. signal is appreciably phase modulated, the extent of the phase modulation being representative of the proximity of the aircraft to the nearest point of approach to the beacon. The beat frequency signal is in effect a sub-carrier of centre frequency 7 kc./s. upon which a phase modulation due to the proximity effect is superimposed, and also, of course, an amplitude modulation at a frequency representing the angle of elevation of the aircraft.

It is emphasized that the phase modulation on the 7 kc./s. beat signal is virtually unaffected by any instability in the frequency determining components in the ground station transmitter or the aircraft receiver. If the frequency stability of both the transmitter and receiver were of a sufficiently high order, it would be possible to omit the carrier wave signal and to detect the phase modulation superimposed on the received signal from the beacon aerial array by, say, heterodyning it with an oscillator in the receiver and applying the beat signal to a phase modulation detector. The means used to extract the required elevation angle information from the total modulation superimposed on the 7 kc./s. signal will now be described.

Referring to FIG. 3 there is shown a schematic diagram of part of the beacon receiver arrangement in an aircraft. This includes an aerial 213 connected to the input circuit of a pre-selector unit 200 comprising a R.F. amplifier, I.F. amplifier, and amplitude detector. The output circuit of the pre-selector unit 200 is connected to the input terminals of a filter network 201, tuned to 7 kc./s. One set of output terminals of the filter 201 is connected to the input circuit of an amplitude detector 202, a second set of output terminals being connected to the input circuit of an amplitude limiter 204. A frequency discriminator 205 has input terminals connected to the output circuit of the limiter 204 and output terminals connected to the input circuit of an amplitude detector 207. The amplitude detector 207 has an output circuit connected to one set of input terminals 214 of an additive combiner network 209.

The combiner network 209 has a second set of input terminals connected to one set of output terminals 217 of a frequency responsive network 210.

A pair of output terminals 215 of the combiner network 209 is connected to the terminals 220 of the fixed coil of a dynamometer type moving coil indicator 212. A second set of output terminals 218 of the network 210 is connected to the terminals 219 of the moving coil of the indicator 212.

Input terminals of the network 210 are connected to an output circuit of a second amplitude limiter 203. An input circuit of the limiter 203 is connected to an output circuit of the amplitude detector 202.

The 7 kc./s. beat signal produced by amplitude detection of the unmodulated and the commutated aerial signals in the pre-selector unit 200 is selected by the filter 201. The amplitude-modulation superimposed on the 7 kc./s. signal is detected by the amplitude detector 202, an audio tone being obtained from the output circuit of the detector 202. The frequency of this tone, as in the case of the basic system illustrated in FIG. 1, is dependent upon the angle of elevation of the aircraft. The audio tone is amplitude limited in the amplitude limiter 203 and is then fed to the frequency responsive network 210. The network 210 has an approximately linear relationship between the frequency of the applied input signal and the magnitude of the D.C. output signal, part of which is applied to the moving coil of the indicator 212 and the remainder to the input terminals 216 of the combiner network 209.

Part of the 7 kc./s. signal selected by the filter 201 is applied to the amplitude limiter 204. The output signal obtained from the limiter 204 is therefore free from amplitude modulation, but will be appreciably phase-modulated when the aircraft approaches close to the beacon aerial array. An effective frequency modulation of the signal at the output of the limiter 204 occurs as a result of the phase modulation superimposed on the 7 kc./s. signal. The frequency modulation of the signal at the output of the limiter 204 results from the fact that the input signal to the amplitude limiter 204 is phase-modulated, owing to the tilting of the beacon aerial array, and the output signal from the limiter is therefore similarly phase modulated. The phase modulation of the output signal results in frequency modulation of the output signal since the frequency of a wave is equal to the rate of change of phase of the wave. The frequency modulation and hence the phase modulation is detected by the frequency discriminator 205, from the output of which a signal at the repetition frequency of the beacon array commutation frequency is obtained. The amplitude of the output signal from the frequency discriminator is dependent upon the amount of the phase modulation on the 7 kc./s. signal.

The frequency difference between the signals radiated from the beacon array and the carrier wave signal could be other than 7 kc./s. It is desirable that the frequency difference shall not be too great so that both sets of signals can be amplified in a common pre-selector unit in the receiver. It is most important that a constant frequency difference is maintained between the carrier wave and the signals fed to the glide-path beacon array in order to avoid spurious phase modulation of the beat frequency signal. This is achieved in this embodiment of the invention by making the signal fed to the beacon array a sideband of the carrier wave signal. The output signal from the discriminator 205 is detected in the amplitude detector 207 and the resulting D.C. signal is applied to one set of input terminals 214 of the combiner 209. The output signal from the combiner 209 is applied to the fixed coil of the indicator 212 at terminals 220.

The current flowing in the moving coil of the indicator 212 is thus always dependent upon the angle of elevation of the aircraft, while the current flowing in the fixed coil of the indicator is dependent partly upon the angle of elevation and partly upon the proximity of the aircraft to the beacon aerial array. The current in the fixed coil of the indicator thus consists of two components which will be termed respectively the "elevation current" and the "proximity current."

Except when the aircraft is very close to the beacon aerial array, the "proximity," current is inappreciable in comparison to the "elevation" current. The indicator 212 thus records the angle of elevation of the aircraft in the same way as in the basic system discussed in connection with FIG. 1. As the aircraft approaches the beacon closely the "proximity" current becomes appreciable, and since the deflection of the indicator is proportional to the product of the currents flowing in the fixed and moving coils, the indicated angle of elevation is enhanced by the presence of the "proximity" current. The effect of adjusting the glide-slope of the aircraft for a constant indicator deflection therefore ensures that the correct glide-slope tends to be maintained throughout the descent.

The indicated angle of elevation, is dependent upon the "elevation current" which always flows in the same direction. By a suitable choice of the fraction of the "elevation current" which is combined with the "proximity current" in the combiner 209, a satisfactory glide-path approach may be made. The magnitude of the fraction of the "elevation current" which gives optimum compensation of the normal distortions of the glide-path depends upon the desired glide-slope. Means may be incorporated in the receiver in order to pre-set the fraction of the "elevation current" fed to the combiner 209, in accordance with the particular glide-slope required.

In the absence of the corrective action of the "proximity current," the severity of the apparent flattening of the glide-paths close to the beacon varies according to the amount by which the beacon aerial array is off-set from the approach path. Any variations in the amount of the off-set are to some extent automatically compensated for in the invention as the corrective effect of the "proximity current" becomes appreciable earlier in the glide-path approach for larger amounts of off-set.

Instead of combining a fraction of the "elevation current" with the "proximity current" in the combiner 209, the "proximity current" may be combined with a constant direct current. The deflection of the dynamometer indicator 212 is then proportional to the product of the "elevation current" and the sum of the proximity and the constant direct current, and the glide-slope scale of the indicator is therefore linear with angle of elevation. If, as shown in FIG. 3, a fraction of the "elevation current" is fed to the fixed coil of the indicator 212, the deflection is proportional to the square of the angle of elevation and the glide-slope scale is rather crowded at low angles of elevation.

The "proximity current" could also be used to obtain the final azimuth bearing information when the aircraft is very close to the touch-down point.

The unmodulated carrier signal required to be radiated from the ground may sometimes be already available in the form of the main carrier wave of an associated navigational aid, for example, the main carrier wave of a beacon used for guidance in the horizontal plane. In this case the signal radiated from the beacon array would behave as an additional sub-carrier on the signal radiated by the horizontal (azimuth) guidance beacon.

It is not essential to the invention to energize the aerials in an exact successive sequence but in order to reduce the bandwidth required by the receiver the aerials 101–120 shown in FIG. 2 are energized in the following sequence: 120, 119 ... 102, 101, blank, 101, 102 ... 119, 120 and so on.

During the "blank" position, which corresponds to radiation from an aerial at ground level, the transmitter output circuit is terminated in a dummy load. The above arrangement ensures that there is no transient phase shift of the radiated signal between the 101, blank and 101 positions. There is therefore only one position at which a phase transient may occur (at 120) during each cycle of commutation. This minimizes the frequency bandwidth occupied by the beat freqeuncy obtained at the receiver from the amplitude detection of the direct and ground-reflected signals radiated from the beacon aerial array.

The amplitude detector 202 has an approximately square-law characteristic, in order that the audio beat tone obtained from the output shall have an approximately sinusoidal waveform.

Although the number of aerials used in the beacon array is made equal to 20 in the embodiment previously described, in other applications of the invention some other number may be more suitable. The embodiment described enables glide-paths having glide-slopes over a range of 3 degrees to 60 degrees to be utilized. If the maximum glide-slope required does not exceed 30 degrees, the number of aerials may be halved.

The precision with which the glide-path approach may be made depends upon the total height of the aerial array. A significant improvement in the precision may be obtained by increasing the total height of the array to 10λ.

If glide-path information up to an angle of elevation of 90 degrees is required the vertical height difference between successive aerials must not exceed an amount equivalent to λ/4. In cases where very precise information up to angles of elevation of 90 degrees is required it may be necessary to increase the number of aerials to about 40.

Instead of tilting the array of stacked aerials it is possible to obtain the proximity current by commutating signals to a second aerial array which, like the tilted array, consists of a number of aerials arrayed at different perpendicular distances from the vertical plane of the aircraft approach path. In a second embodiment of the invention it is sometimes found that a better compensation is obtained from the proximity current over a wide range of glide-path angles and a wide-range of beacon array off-set distances. Furthermore the proximity current does not permit the aircraft to rise after touch-down.

In the second embodiment of the invention, which will now be described with reference to FIG. 4 of the accompanying drawings, the second aerial array forms part of a beacon used for guidance in the horizontal plane.

The horizontal guidance beacon includes two horizontal aerial arrays (300 and 301) situated in line on either side of and perpendicular to an airfield runway 302. Each of the aerials 300 and 301 is connected through respective commutator switches 303 and 304 to separate outputs of a transmitter 305. A further aerial 306 is also connected to a third output of the transmitter 305. The transmitter 305 radiates a carrier wave signal from the aerial 306 at a frequency F and two side band signals at $F+f_1$ and $F+f_2$. These sideband signals are commutated cyclically to each of the aerials of the arrays 300 and 301, the commutator switches 303 and 304 being displaced in phase relatively to one another. The horizontal guidance information is obtained by beating the sideband signals at $F+f_1$ and $F+f_2$ with the carrier F in the aircraft receiver and determining the sum of and the difference between the frequency modulations superimposed on the commutated signals.

A third sideband signal frequency $F+f_3$ is fed to the glide path beacon aerial array 307, which is situated in approximately the same vertical plane as the array 301. The signal at $F+f_3$ is fed to the array 307 via a third commutator switch 309. The array 307 is off-set from the runway and is situated on a line 308 which intersects the runway at right angles at the aircraft touch-down point P. The array 307 is similar to that shown in FIG. 2 except that it is vertical.

The sideband signal $F+f_3$ radiated from the glide-path beacon array 307 beats with the carrier signal F in the aircraft receiver to produce a beat signal of frequency $f_3$ which is amplitude modulated at a frequency determined by the angle of elevation of the aircraft. The sideband signal at $F+f_1$ radiated from the horizontal guidance beacon array 301 also beats with the carrier signal F to produce a beat signal of frequency $f_1$ which is phase modulated by an amount which is dependent upon the proximity of the aircraft receiver to the array 301.

The signals of frequency $f_1$ are separated from those of frequency $f_3$ by means of filters. The "elevation" and "proximity" currents are obtained from the signals at $f_3$ and $f_1$ respectively using the arrangement previously described with reference to FIG. 3.

Although the embodiment of the invention described refers to a system in which a ground beacon transmits signals to a receiver in an aircraft, the invention is also applicable to a system in which signals are transmitted from an aircraft and are picked up by a ground receiving aerial array of a similar form to the ground beacon aerial array previously described.

For example the aerials 101–120 of FIG. 2 may be used to receive signals transmitted from an aircraft by both a direct and a ground-reflected path. The received signals are transmitted over the feeders 121–140 to the commutator arrangement 141, which feeds the radio frequency energy received by each of the aerials 101–120 successively to the input of a receiver denoted by the block 142, over the signal feed arrangement. The receiver 142 is identical to that shown in FIG. 3.

It is to be understood that the foregoing description of specific examples of this invention is not to be considered as a limitation on its scope.

What we claim is:

1. A radio navigation system including at a fixed station an aerial array having a number of stacked aerials each arranged at a different height above ground, a common signal feed arrangement, means to connect the common signal feed arrangement to each of the aerials in a cyclic order, said aerial array being disposed to the side of an approach path of a mobile station to the fixed station and a second signal feed arrangement connected to a second number of aerials arranged at different perpendicular distances from the vertical plane in which the said approach path lies.

2. An arrangement as claimed in claim 1 in which the array of stacked aerials is inclined with respect to a plane perpendicular to the ground plane.

3. An arrangment according to claim 1 including a further aerial connected to a source of electrical carrier wave energy having a frequency which differs from the frequency of the radio frequency energy fed to the aerials of the said aerial array by a fixed amount.

4. A system according to claim 3 in which the aerials of the said array are vertically stacked and the said further aerial and the said second number of aerials are part of a further radio navigation beacon which provides guidance in a horizontal plane.

5. A system are claimed in claim 1 wherein said mobile station comprises a receiver having a phase modulation detector arrangement to detect the amount of the phase modulation superimposed on a received signal, the said phase modulation being dependent upon the proximity of the mobile station to the fixed station, an amplitude detector to detect the frequency of the signal dependent on the elevation angle, a frequency responsive network coupled to said amplitude detector, an indicator device and means coupling said indicator device to the output of the frequency responsive network and to the output of the phase modulation detector arrangement.

6. A system as claimed in claim 5 wherein said receiver comprises an other amplitude detector in which the phase modulated received signal is beaten with a received carrier wave signal and a filter to select the beat frequency signal produced in the said other amplitude detector.

7. A mobile system station as claimed in claim 5 in which the said indicator device is a dynamometer having a fixed coil and a moving coil, one of the said coils being connected to receive an output current signal from the frequency responsive network and the other of the said coils is connected to receive a current signal obtained by combining a fraction of the output current signal from the frequency responsive network with the output current signal from the phase modulation detector.

8. A mobile station as claimed in claim 5 in which the said indicator device is a dynamometer having a fixed coil and a moving coil, one of the said coils being connected to receive an output current signal from the frequency responsive network and the other of the said coils is connected to receive a current signal obtained by combining an output current signal from the phase modulation detector arrangement with a direct current of fixed value.

9. A method of determining the angle of elevation of a mobile station with respect to a fixed station which includes the steps of switching radio frequency electrical energy successively to each one of a number of stacked aerials each of which is arranged at a different height above the ground at the fixed station, receiving at the mobile station signals radiated from the stacked aerials both by a direct path and by reflection from the ground, beating the received signals together in an amplitude detector, and measuring the frequency of the beat signal.

10. A method of determining the angle of elevation of a mobile receiver with respect to a fixed station as claimed in claim 9 in which the said stacked aerials are offset from an approach path of the mobile receiver to the fixed station and which includes the steps of switching radio frequency energy successively to each one of a further number of aerials arranged at the ground station at different perpendicular distances from the vertical plane of the approach path of the mobile station, detecting the amount of phase modulation superimposed on the signals received from the further number of aerials, and feeding both a first signal of magnitude which depends upon the amount of the said phase modulation and a second signal of magnitude which depends upon the frequency of the said beat signal to an indicator device responsive to the magnitudes of both the first and second signals.

11. A radio navigation system including at a fixed station an aerial array having a number of stacked aerials each arranged at a different height above ground, a common signal feed arrangement, means to connect the common signal feed arrangement to each of the aerials in the cyclic order, and comprising at a mobile station a receiver having an amplitude detector, a frequency responsive network coupled to the output of the amplitude detector and an indicator devices coupled to the output of the frequency responsive network, arranged to derive navigational information from signals transmitted from said aerial array.

12. A radio navigation system including at a fixed station an aerial array having a number of stacked aerials each arranged at a different height above ground, a common signal feed arrangement, means to connect the common signal feed arrangement to each of the aerials in a cyclic order, means coupling the common signal feed arrangement to a receiver, said receiver having an amplitude detector, a frequency responsive network coupled to the output of said amplitude detector and an indictator device coupled to the output of the frequency responsive network arranged to derive positional information from signals transmitted from a transmitter at a mobile station.

13. A radio navigation system including at a fixed station an aerial array having a number of stacked aerials each arranged at a different height above ground, a common signal feed arrangement, means to connect the common signal feed arrangement to each of the aerials in a cyclic order, means spacing the stacked aerials uniformly and means connecting the signal feed arrangement to adjacent aerials successively in both directions.

References Cited by the Examiner

UNITED STATES PATENTS 2,422,333  6/1947  Bedford _____ 343—16 X

CHESTER L. JUSTUS, *Primary Examiner.*